(12) United States Patent
Kothari

(10) Patent No.: US 7,460,246 B2
(45) Date of Patent: Dec. 2, 2008

(54) METHOD AND SYSTEM FOR SENSING LIGHT USING INTERFEROMETRIC ELEMENTS

(75) Inventor: Manish Kothari, Cupertino, CA (US)

(73) Assignee: IDC, LLC, San Fancisco, CA (US)

( * ) Notice: Subject to any disclaimer, the term of this patent is extended or adjusted under 35 U.S.C. 154(b) by 243 days.

(21) Appl. No.: 11/066,724

(22) Filed: Feb. 24, 2005

(65) Prior Publication Data

US 2006/0066876 A1 Mar. 30, 2006

Related U.S. Application Data

(60) Provisional application No. 60/613,624, filed on Sep. 27, 2004.

(51) Int. Cl.
*G01B 9/02* (2006.01)
(52) U.S. Cl. ...................... 356/519; 356/454
(58) Field of Classification Search ............ 250/339.04, 250/339.05, 339.01; 356/454, 480, 519, 356/506
See application file for complete search history.

(56) References Cited

U.S. PATENT DOCUMENTS

| | | | |
|---|---|---|---|
| 2,534,846 A | 12/1950 | Ambrose et al. | |
| 3,184,600 A | 5/1965 | Potter | |
| 3,371,345 A | 2/1968 | Lewis | |
| 3,410,363 A | 11/1968 | Schwartz | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,746,785 A | 7/1973 | Te Velde | |
| 3,813,265 A | 5/1974 | Marks | |
| 3,955,880 A | 5/1976 | Lierke | |
| 4,099,854 A | 7/1978 | Decker et al. | |
| 4,228,437 A | 10/1980 | Shelton | |
| 4,347,983 A | 9/1982 | Bodai | |
| 4,377,324 A | 3/1983 | Durand et al. | |
| 4,389,096 A | 6/1983 | Hori et al. | |

(Continued)

FOREIGN PATENT DOCUMENTS

EP 0261897 A2 3/1988

(Continued)

OTHER PUBLICATIONS

Roc Pat Pub No. 157313, May 1, 1991, FSI International, Inc.

(Continued)

*Primary Examiner*—Hwa (Andrew) S Lee
(74) *Attorney, Agent, or Firm*—Knobbe, Martens, Olson & Bear LLP

(57) ABSTRACT

Certain embodiments of the invention provide a light sensor comprising at least one interferometric element that absorbs light in at least one wavelength. The interferometric element comprises a first surface and a second surface substantially parallel to the first surface. The second surface is spaced a gap distance from the first surface in a direction substantially perpendicular to the first surface. The light wavelength absorbed is dependent on the gap distance. The interferometric element further comprises a temperature sensor. The temperature sensor is responsive to changes in temperature of at least a portion of the interferometric element due to absorption of light by the interferometric element.

17 Claims, 12 Drawing Sheets

U.S. PATENT DOCUMENTS

| | | |
|---|---|---|
| 4,392,711 A | 7/1983 | Moraw et al. |
| 4,403,248 A | 9/1983 | Te Velde |
| 4,441,791 A | 4/1984 | Hornbeck |
| 4,445,050 A | 4/1984 | Marks |
| 4,459,182 A | 7/1984 | Te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,900,136 A | 2/1990 | Goldburt et al. |
| 4,900,395 A | 2/1990 | Syverson et al. |
| 4,954,789 A | 9/1990 | Sampsell |
| 4,956,619 A | 9/1990 | Hornbeck |
| 4,965,562 A | 10/1990 | Verhulst |
| 4,977,009 A | 12/1990 | Anderson et al. |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,126,836 A | 6/1992 | Um |
| 5,142,405 A | 8/1992 | Hornbeck |
| 5,142,414 A | 8/1992 | Koehler |
| 5,148,157 A | 9/1992 | Florence |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,185,660 A | 2/1993 | Um |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,244,707 A | 9/1993 | Shores |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,304,419 A | 4/1994 | Shores |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,353,114 A | 10/1994 | Hansen |
| 5,358,601 A | 10/1994 | Cathey |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,450,205 A | 9/1995 | Sawin et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,580,144 A | 12/1996 | Stroomer |
| 5,581,272 A | 12/1996 | Conner et al. |
| 5,583,688 A | 12/1996 | Hornbeck |
| 5,589,689 A * | 12/1996 | Koskinen ............... 250/339.01 |
| 5,589,852 A | 12/1996 | Thompson et al. |
| 5,591,379 A | 1/1997 | Shores |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoades et al. |

| | | |
|---|---|---|
| 5,619,366 A | 4/1997 | Rhoads et al. |
| 5,629,790 A | 5/1997 | Neukermans et al. |
| 5,636,052 A | 6/1997 | Arney et al. |
| 5,636,185 A | 6/1997 | Brewer et al. |
| 5,646,768 A | 7/1997 | Kaeriyama |
| 5,650,881 A | 7/1997 | Hornbeck |
| 5,654,741 A | 8/1997 | Sampsell et al. |
| 5,656,816 A | 8/1997 | Tanaka et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,673,139 A | 9/1997 | Johnson |
| 5,683,591 A | 11/1997 | Offenberg |
| 5,699,074 A | 12/1997 | Sutherland et al. |
| 5,703,710 A | 12/1997 | Brinkman et al. |
| 5,710,656 A | 1/1998 | Goosen |
| 5,726,480 A | 3/1998 | Pister |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,784,190 A | 7/1998 | Worley |
| 5,784,212 A | 7/1998 | Hornbeck |
| 5,793,504 A | 8/1998 | Stoll |
| 5,808,780 A | 9/1998 | McDonald |
| 5,815,141 A | 9/1998 | Phares |
| 5,818,095 A | 10/1998 | Sampsell |
| 5,825,528 A | 10/1998 | Goosen |
| 5,835,255 A | 11/1998 | Miles |
| 5,842,088 A | 11/1998 | Thompson |
| 5,912,758 A | 6/1999 | Knipe et al. |
| 5,943,158 A | 8/1999 | Ford et al. |
| 5,945,980 A | 8/1999 | Moissev et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,160,833 A | 12/2000 | Floyd et al. |
| 6,180,428 B1 | 1/2001 | Peeters et al. |
| 6,201,633 B1 | 3/2001 | Peeters et al. |
| 6,222,511 B1 | 4/2001 | Stoller et al. |
| 6,232,936 B1 | 5/2001 | Gove et al. |
| 6,242,989 B1 | 6/2001 | Barber et al. |
| 6,243,149 B1 | 6/2001 | Swanson et al. |
| 6,275,220 B1 | 8/2001 | Nitta |
| 6,282,010 B1 | 8/2001 | Sulzbach et al. |
| 6,295,154 B1 | 9/2001 | Laor et al. |
| 6,304,297 B1 | 10/2001 | Swan |
| 6,307,194 B1 * | 10/2001 | Fitzgibbons et al. ..... 250/208.1 |
| 6,323,982 B1 | 11/2001 | Hornbeck |
| 6,339,417 B1 | 1/2002 | Quanrud |
| 6,395,863 B2 | 5/2002 | Geaghan |
| 6,424,094 B1 | 7/2002 | Feldman |
| 6,447,126 B1 | 9/2002 | Hornbeck |
| 6,465,355 B1 | 10/2002 | Horsley |
| 6,466,354 B1 | 10/2002 | Gudeman |
| 6,466,358 B2 | 10/2002 | Tew |
| 6,473,072 B1 | 10/2002 | Comiskey et al. |
| 6,473,274 B1 | 10/2002 | Maimone et al. |
| 6,480,177 B2 | 11/2002 | Doherty et al. |
| 6,496,122 B2 | 12/2002 | Sampsell |
| 6,545,335 B1 | 4/2003 | Chua et al. |
| 6,548,908 B2 | 4/2003 | Chua et al. |
| 6,549,195 B2 | 4/2003 | Hikida et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,600,201 B2 | 7/2003 | Hartwell et al. |
| 6,606,175 B1 | 8/2003 | Sampsell et al. |
| 6,625,047 B2 | 9/2003 | Coleman, Jr., deceased |
| 6,630,786 B2 | 10/2003 | Cummings et al. |
| 6,632,698 B2 | 10/2003 | Ives |
| 6,643,069 B2 | 11/2003 | Dewald |
| 6,650,455 B2 | 11/2003 | Miles |
| 6,666,561 B1 | 12/2003 | Blakley |
| 6,674,090 B1 | 1/2004 | Chua et al. |
| 6,674,562 B1 | 1/2004 | Miles et al. |
| 6,680,792 B2 | 1/2004 | Miles |
| 6,710,908 B2 | 3/2004 | Miles et al. |
| 6,741,377 B2 | 5/2004 | Miles |
| 6,741,384 B1 | 5/2004 | Martin et al. |
| 6,741,503 B1 | 5/2004 | Farris et al. |
| 6,747,785 B2 | 6/2004 | Chen et al. |
| 6,747,800 B1 | 6/2004 | Lin |
| 6,762,873 B1 | 7/2004 | Coker et al. |
| 6,775,174 B2 | 8/2004 | Huffman et al. |
| 6,778,155 B2 | 8/2004 | Doherty et al. |
| 6,794,119 B2 | 9/2004 | Miles |
| 6,811,267 B1 | 11/2004 | Allen et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,952,303 B2 | 10/2005 | Lin et al. |
| 6,958,847 B2 | 10/2005 | Lin |
| 7,123,216 B1 | 10/2006 | Miles |
| 7,126,741 B2 * | 10/2006 | Wagner et al. .............. 359/290 |
| 7,138,984 B1 | 11/2006 | Miles |
| 7,280,265 B2 | 10/2007 | Miles |
| 2001/0003487 A1 | 6/2001 | Miles |
| 2001/0050666 A1 | 12/2001 | Huang et al. |
| 2002/0012159 A1 | 1/2002 | Tew |
| 2002/0015215 A1 | 2/2002 | Miles |
| 2002/0024711 A1 | 2/2002 | Miles |
| 2002/0041264 A1 | 4/2002 | Quanrud |
| 2002/0054424 A1 | 5/2002 | Miles |
| 2002/0075555 A1 | 6/2002 | Miles |
| 2002/0126364 A1 | 9/2002 | Miles |
| 2002/0134939 A1 * | 9/2002 | Giedd ..................... 250/338.1 |
| 2002/0149828 A1 | 10/2002 | Miles |
| 2002/0171610 A1 | 11/2002 | Siwinski et al. |
| 2002/0175284 A1 | 11/2002 | Vilain |
| 2002/0181208 A1 | 12/2002 | Credelle et al. |
| 2002/0186209 A1 | 12/2002 | Cok |
| 2003/0004272 A1 | 1/2003 | Power |
| 2003/0043157 A1 | 3/2003 | Miles |
| 2003/0072070 A1 | 4/2003 | Miles |
| 2003/0107805 A1 | 6/2003 | Street |
| 2003/0122773 A1 | 7/2003 | Washio |
| 2003/0128197 A1 | 7/2003 | Turner et al. |
| 2003/0132386 A1 * | 7/2003 | Carr et al. ................ 250/338.1 |
| 2003/0141453 A1 | 7/2003 | Reed et al. |
| 2003/0173504 A1 | 9/2003 | Cole et al. |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0051929 A1 | 3/2004 | Sampsell et al. |

| | | | |
|---|---|---|---|
| 2004/0058532 A1 | 3/2004 | Miles et al. | |
| 2004/0080807 A1 | 4/2004 | Chen et al. | |
| 2004/0125281 A1 | 7/2004 | Lin et al. | |
| 2004/0145049 A1 | 7/2004 | McKinnell et al. | |
| 2004/0145811 A1 | 7/2004 | Lin et al. | |
| 2004/0147056 A1 | 7/2004 | McKinnell et al. | |
| 2004/0147198 A1 | 7/2004 | Lin et al. | |
| 2004/0150939 A1 | 8/2004 | Huff | |
| 2004/0160143 A1 | 8/2004 | Shreeve et al. | |
| 2004/0174583 A1 | 9/2004 | Chen et al. | |
| 2004/0175577 A1 | 9/2004 | Lin et al. | |
| 2004/0179281 A1 | 9/2004 | Reboa | |
| 2004/0207897 A1 | 10/2004 | Lin | |
| 2004/0209192 A1 | 10/2004 | Lin et al. | |
| 2004/0209195 A1 | 10/2004 | Lin | |
| 2004/0212026 A1 | 10/2004 | Van Brocklin et al. | |
| 2004/0217378 A1 | 11/2004 | Martin et al. | |
| 2004/0217919 A1 | 11/2004 | Pichl et al. | |
| 2004/0218251 A1 | 11/2004 | Piehl et al. | |
| 2004/0218334 A1 | 11/2004 | Martin et al. | |
| 2004/0218341 A1 | 11/2004 | Martin et al. | |
| 2004/0227493 A1 | 11/2004 | Van Brocklin et al. | |
| 2004/0240032 A1 | 12/2004 | Miles | |
| 2004/0240138 A1 | 12/2004 | Martin et al. | |
| 2004/0245588 A1 | 12/2004 | Nikkel et al. | |
| 2004/0263944 A1 | 12/2004 | Miles et al. | |
| 2005/0001828 A1 | 1/2005 | Martin et al. | |
| 2005/0002082 A1 | 1/2005 | Miles | |
| 2005/0003667 A1 | 1/2005 | Lin et al. | |
| 2005/0017177 A1* | 1/2005 | Tai et al. | 250/338.4 |
| 2005/0017942 A1 | 1/2005 | Tsujino et al. | |
| 2005/0024557 A1 | 2/2005 | Lin | |
| 2005/0035699 A1 | 2/2005 | Tsai | |
| 2005/0036095 A1 | 2/2005 | Yeh et al. | |
| 2005/0036192 A1 | 2/2005 | Lin et al. | |
| 2005/0038950 A1 | 2/2005 | Adelmann | |
| 2005/0042117 A1 | 2/2005 | Lin | |
| 2005/0046922 A1 | 3/2005 | Lin et al. | |
| 2005/0046948 A1 | 3/2005 | Lin | |
| 2005/0057442 A1 | 3/2005 | Way | |
| 2005/0068583 A1 | 3/2005 | Gutkowski et al. | |
| 2005/0068605 A1 | 3/2005 | Tsai | |
| 2005/0068606 A1 | 3/2005 | Tsai | |
| 2005/0069209 A1 | 3/2005 | Damera-Venkata et al. | |
| 2005/0078348 A1 | 4/2005 | Lin | |
| 2005/0168849 A1 | 8/2005 | Lin | |
| 2005/0195462 A1 | 9/2005 | Lin | |
| 2005/0202649 A1 | 9/2005 | Hung et al. | |

FOREIGN PATENT DOCUMENTS

| | | |
|---|---|---|
| EP | 0 354 369 | 2/1990 |
| EP | 0608056 A1 | 7/1994 |
| EP | 0667548 | 8/1995 |
| EP | 0986077 A2 | 3/2000 |
| EP | 1067805 A2 | 1/2001 |
| JP | 3109524 A | 5/1991 |
| JP | 405275401 | 10/1993 |
| JP | 10161630 A | 6/1998 |
| WO | WO 94/29840 A1 | 12/1994 |
| WO | WO 95/30924 | 11/1995 |
| WO | WO 97/17628 | 5/1997 |
| WO | WO 99/52006 A2 | 10/1999 |
| WO | WO 99/52006 A3 | 10/1999 |
| WO | WO 02/063602 A1 | 8/2002 |
| WO | WO 03/007049 A1 | 1/2003 |
| WO | WO 03/069413 A1 | 8/2003 |
| WO | WO 03/073151 A1 | 9/2003 |
| WO | WO2004/006003 A1 | 1/2004 |
| WO | WO 2004/026757 A2 | 4/2004 |
| WO | WO 2004/075526 A2 | 9/2004 |

OTHER PUBLICATIONS

Bass, "Handbook of Optics, vol. I, Fundamentals, Techniques, and Design, Second Edition," McGraw-Hill, Inc., New York, pp. 2.29-2.36 (1995).

Ibotson, et al. "Comparison of XeF2, and F-atom reactions with Si and Si02, Applied Physics Letters." vol. 44, No. 12, Jun. 1984. pp. 1129-1131.

Schnakenberg, et al. "THAHW Etchants for Silicon Micromachining." 1991 International Conference on Solid State Sensors and Actuators—Digest of Technical Papers. pp. 815-818.

Williams, et al. Etch Rates for Michromachining Processing—Journal of Microelectromechanical Systems. vol. 5 No. 4, Dec. 1996, pp. 256-269.

Winters, et al., "The Etching of Silicon with XeF2 Vapor." Applied Physics Letters, vol. 34. No. 1, Jan. 1979, pp. 70-73.

Austrian Search Report from U.S. Appl. No. 11/097,509, filed Jul. 14, 2005.

Austrian Search Report from U.S. Appl. No. 11/097,509, filed Jul. 29, 2005.

Austrian Search Report from U.S. Appl. No. 11/096,546, filed May 19, 2005.

Austrian Search Report from U.S. Appl. No. 11/140,560, filed Aug. 11, 2005.

Austrian Search Report from U.S. Appl. No. 11/066,724, filed May 13, 2005.

Austrian Search Report from U.S. Appl. No. 11/097,818, filed Jul. 14, 2005.

Austrian Search Report from U.S. Appl. No. 11/097,820, filed Jun. 29, 2005.

Akasaka, "Three-Dimensional IC Trends," Proceedings of IEEE, vol. 74, No. 12, pp. 1703-1714 (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Billard, C.; "Tunable Capacitor," 5th Annual Review of LETI, Jun. 24, 2003, p. 7.

Bouchaud, Jeremie; Wicht, Henning; "RF MEMES Analysis, Forecasts and Technology Review," Chip Unaxis, date unknown, [online] retrieved from the Internet: <URL:http://semiconductors.unaxis.com/en/download/RF%20MEMS.pdf>.

Chan et al., "Low-Actuation Voltage RF MEMS Shunt Switch With Cold Switching Lifetime of Seven Billion Cycles," Journal of Microelectromechanical Systems vol. 12, No. 5 (Oct. 2003).

Conner, "Hybrid Color Display Using Optical Interference Filter Array," SID Digest, pp. 577-580 (1993).

De Coster et al., "Variable RF MEMS Capacitors With Extended Tuning Range", IEEE International Solid-State Sensors and Actuators Conference, Boston, (Jun. 8-12, 2003).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).

Gosch, "West Germany Grabs the Lead in X-Ray Lithography," Electronics, pp. 78-80 (Feb. 5, 1987).

Heines et al, "Bi-Stable Flat-Panel Display Based on a 180 [DEG.] Flipping Pixel", Conference: Displays IX: Displays for Defense Applications, (Apr. 2-5, 2002), Proceedings of the SPIE: The International Society for Optical Engineering, vol. 4712, pp. 327-335.

Howard et al., "Nanometer-Scale Fabrication Techniques," VLSI Electronics: Microstructure Science, vol. 5, pp. 145-153 and pp. 166-173 (1982).

Jackson, "Classical Electrodynamics," John Wiley & Sons Inc., pp. 568-573, date unknown.

Jerman et al., "A Miniature Fabry-Perot Interferometer with a Corrugated Silicon Diaphragm Support," IEEE Electron Devices Society (1988).

Johnson "Optical Scanners," Microwave Scanning Antennas, vol. 1, pp. 251-261 (1964).

Li, G.P. "On the design and Fabrication of Electrostatic RF MEMS Switches," Final Report 1999-00 for Micro Project 99-071, University of California, Irvine.

Light over Matter, Circle No. 36 (Jun. 1993).

Mait, "Design of Diffractive Optical Elements for Optical Signal Processing", IEEE Lasers and Electro-Optics Society Annual Meeting, pp. 59-60, (Nov. 15-18, 1993).

Miles, "A New Reflective FPD Technology Using Interferometric Modulation," Society for Information Display '97 Digest, Session 7.3.

Newsbreaks, "Quantum-trench devices might operate at terahertz frequencies," Laser Focus World (May 1993).

Nieminen, Heikki, Ermolov, Vladimir; Silanto, Samuli; Nybergh, Kjell; Rhanen, Tapani; "Design of a Temperature-Stable RF MEM Capacitor," Institute of Electrical and Electronics Engineers (IEEE) Journal of Microelectromechanical Systems, vol. 13, No. 5, Oct. 2004, pp. 705-714.

Oliner et al., "Radiating Elements and Mutual Coupling," Microwave Scanning Antennas, vol. 2, p. 131-194 (1966).

Oz et al., "CMOS-Compatible RF-MEMS Tunable Capacitors", IEEE MTT-S International Microwave Symposium—IMS 2003, (Jun. 8-13, 2003).

Pacheco et al. "Design of Low Actuation Voltage RF MEMS Switch" Radiation Laboratory and Center for Microsystems Department of Electrical Engineering and Computer Science University of Michigan, IEEE (2000) 0-7803-5687-X/00/.

Raley et al., "A Fabry-Perot Microinterferometer for Visible Wavelengths," IEEE Solid-State Sensor and Actuator Workshop, Hilton Head, SC (1992).

Solgaard et al., "Interference-Based Optical MEMS Filters", Optical 2004 Fiber Communication Conference, vol. 1, (Feb. 23-27, 2004).

Sperger et al., "High Performance Patterned All-Dielectric Interference Colour Filter for Display Applications," SID Digest, pp. 81-83 (1994).

Stone, "Radiation and Optics, An Introduction to the Classical Theory," McGraw-Hill, pp. 340-343 (1963).

Tan et al. "RF MEMS Simulation-High Isolation CPW Shunt Switches", Ansoft: Global Seminars: Delivering Performance (2003).

Vähä-Heikkilä et al. "Design of Capacitive RF MEMS Power Sensor" VTT Information Technology, (2002), available at <http://www.hut.fi/Units/Radio/URSI02/ursi_vaha-heikkila.pdf>.

Walker, et al., "Electron-beam-tunable Interference Filter Spatial Light Modulator," Optics Letters vol. 13, No. 5, pp. 345-347 (May 1988).

Wang et al., "Design and Fabrication of a Novel Two-Dimension MEMS-Based Tunable Capacitor", IEEE 2002 International Conference on Communications, Circuits and Systems and West Sino Expositions, vol. 2, pp. 1766-1769, (Jun. 29-Jul. 1, 2002).

Winton, John M., "A novel way to capture solar energy," Chemical Week, pp. 17-18 (May 15, 1985).

Wu, "Design of a Reflective Color LCD Using Optical Interference Reflectors," Asia Display '95, pp. 929-931 (Oct. 16, 1995).

Rossberg, Silicon micromachined infrared sensor with tunable wavelength selectivity for application in infrared spectroscopy, Sensors and Actuators A, Elsevier, 47:1-3, (1995) 413-416.

Extended European Search Report for App. No. 05255665.1, dated Jun. 16, 2006.

* cited by examiner

|  | Column Output Signals | |
|---|---|---|
|  | +$V_{bias}$ | -$V_{bias}$ |
| Row Output Signals   0 | Stable | Stable |
| +Δ$V$ | Release | Actuate |

METHOD AND SYSTEM FOR SENSING LIGHT USING INTERFEROMETRIC ELEMENTS

CLAIM OF PRIORITY

This application claims the benefit of U.S. Provisional Application No. 60/613,624, filed Sep. 27, 2004, which is incorporated in its entirety by reference herein.

BACKGROUND

1. Field of the Invention

The field of the invention relates to microelectromechanical systems (MEMS), and more particularly, to electrical connection architectures for arrays of MEMS elements.

2. Description of the Related Technology

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be partially transparent and capable of relative motion upon application of an appropriate electrical signal. One plate may comprise a stationary layer deposited on a substrate, the other plate may comprise a metallic membrane suspended over the stationary layer.

Arrays of independently actuatable interferometric light modulators are used in certain display configurations as display elements. The light modulators are electrically connected so as to provide the control voltages or signals used to individually actuate each light modulator.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

Certain embodiments of the invention provide a light sensor comprising at least one interferometric element that absorbs light in at least one wavelength. The interferometric element comprises a first surface and a second surface substantially parallel to the first surface. The second surface is spaced a gap distance from the first surface in a direction substantially perpendicular to the first surface. The light wavelength absorbed is dependent on the gap distance. The interferometric element further comprises a temperature sensor. The temperature sensor is responsive to changes in temperature of at least a portion of the interferometric element due to absorption of light by the interferometric element.

In certain embodiments, the light sensor comprises a plurality of interferometric elements. Each interferometric element has a corresponding gap distance and absorbs light in at least one wavelength. In certain embodiments, each interferometric element comprises substantially the same gap distance as the other interferometric elements. In certain other embodiments, the plurality of interferometric elements comprises two or more subsets of interferometric elements. Each interferometric element of a subset comprises substantially the same gap distance as the other interferometric elements of the subset. Each subset has a different gap distance and absorbs light in at least one different wavelength.

In certain embodiments, the light sensor further comprises an array of color filters. Each color filter is positioned such that light impinging on a corresponding interferometric element propagates through the color filter. Each color filter substantially transmits at least one wavelength of light that corresponds to the interferometric element.

In certain embodiments, the first surface of the interferometric element is a fixed surface and the second surface is a movable surface. In a first state of the interferometric element, the movable surface is spaced a first distance from the fixed surface in a direction substantially perpendicular to the fixed surface. In a second state, the movable surface is spaced a second distance, different from the first distance, from the fixed surface in a direction substantially perpendicular to the fixed surface. In certain embodiments, either the first distance or the second distance is approximately zero.

In certain embodiments, the interferometric element comprises two or more colors. In certain embodiments, the interferometric element comprises a single color of light (e.g., red, green, or blue light).

In certain embodiments, at least one interferometric element is used as a light sensor. In certain other embodiments, a plurality of interferometric elements is used for image capture.

DETAILED DESCRIPTION OF CERTAIN EMBODIMENTS

An exemplary embodiment of a light sensor having at least one interferometric element and a temperature sensor is described. The interferometric element absorbs a wavelength of ambient light in the form of heat on a surface of the interferometric modulator. The absorbed heat is sensed by the temperature sensor. The temperature sensor may be a contact or non-contact sensor. The temperature sensor responds to the heat absorbed by the surface of the interferometric modulator. The temperature sensor outputs data, for example a voltage, indicative of the sensed temperature. In certain embodiments, the outputted data is processed and stored as a digital image. In certain other embodiments, the outputted data is utilized to set the amount of front light or back light illuminating a display device to better make the display device readable in the ambient light.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
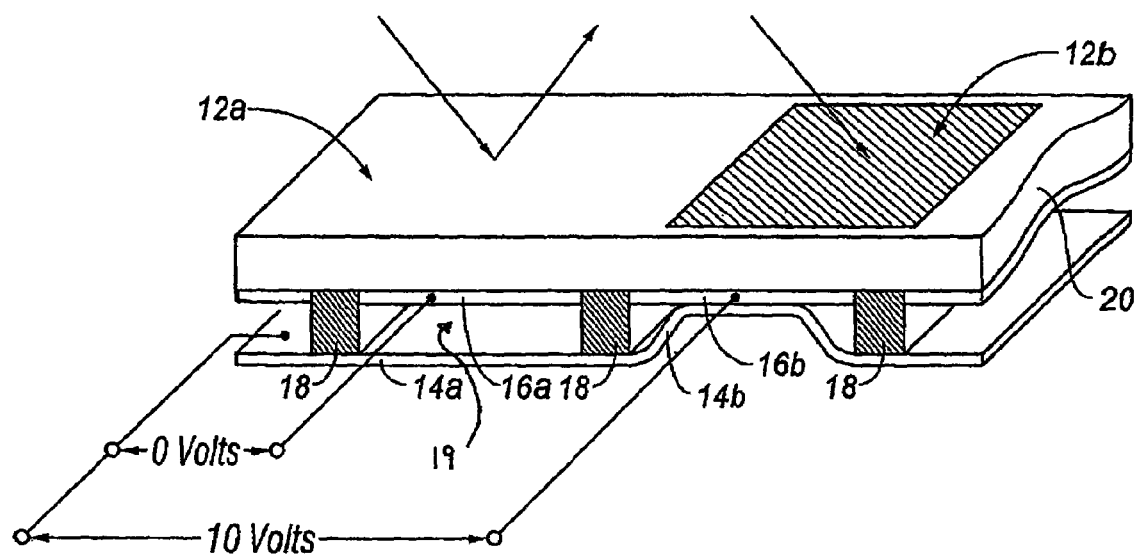
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user.

Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
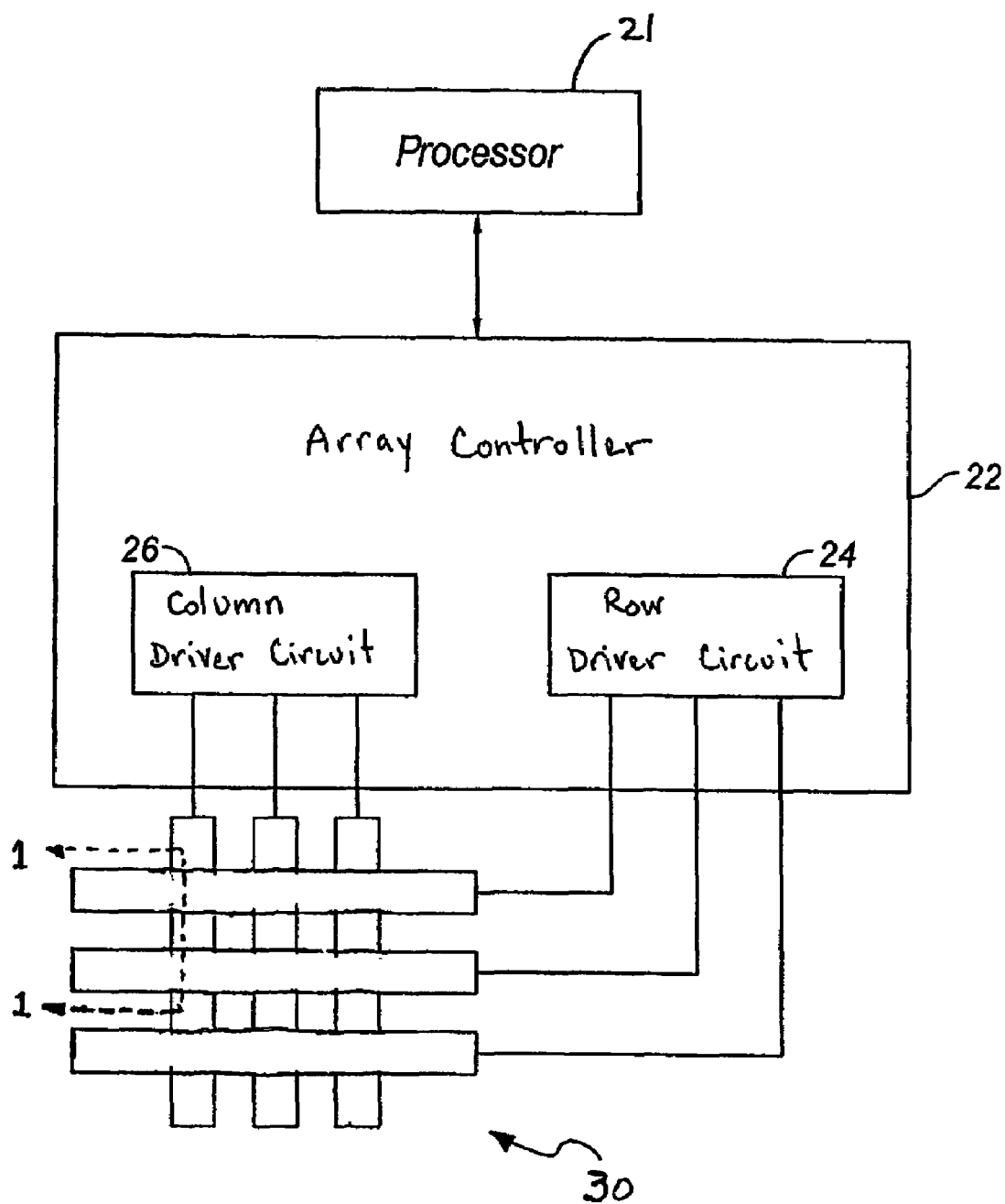
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
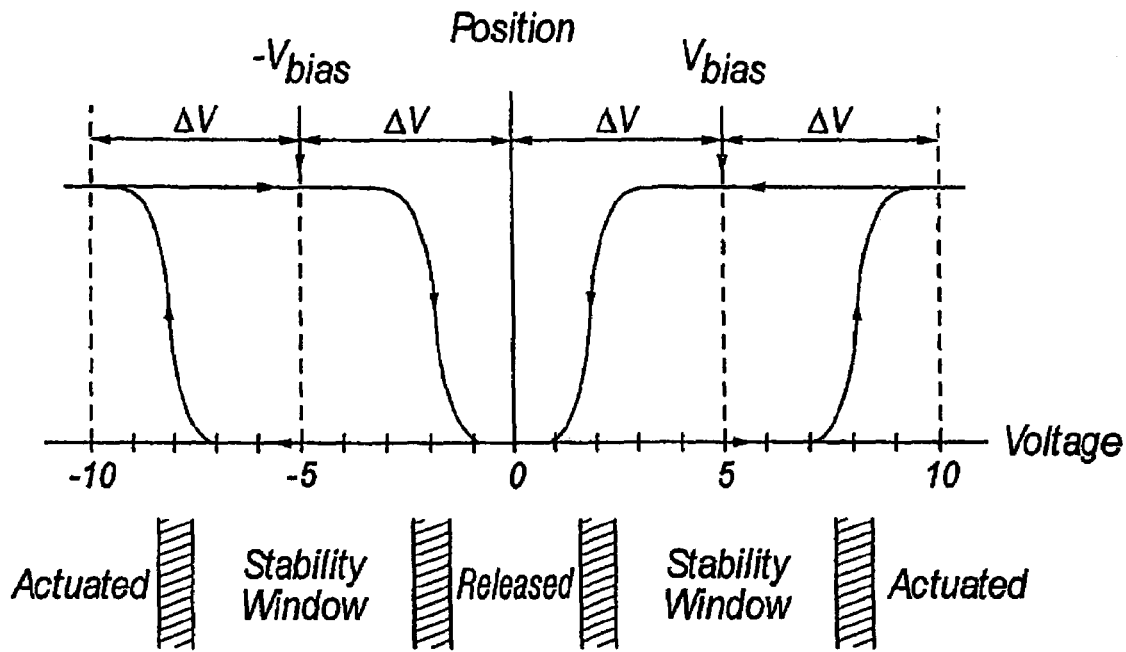
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively. Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
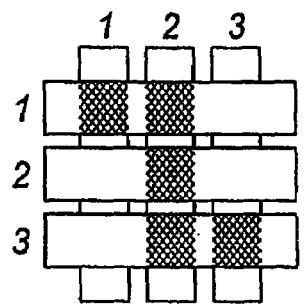
FIGS. 5A and 5B illustrate one exemplary timing diagram for row and column signals that may be used to write a frame of display data to the 3×3 interferometric modulator display of FIG. 3.
Figure 5B:
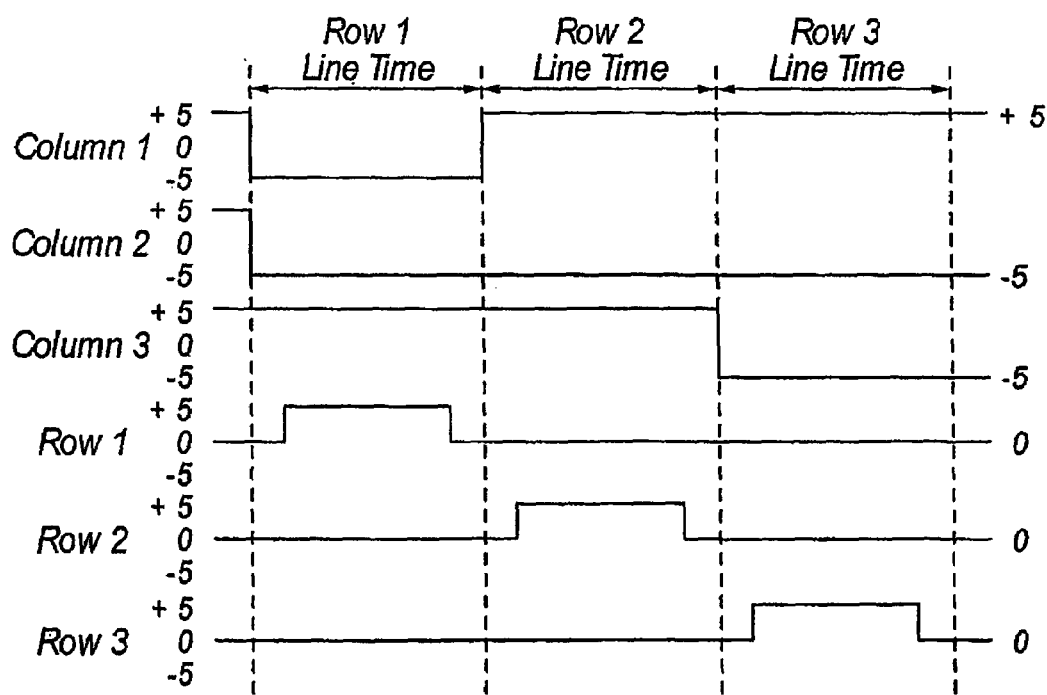

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
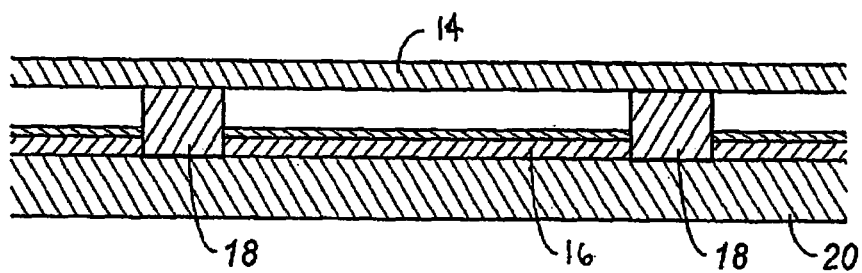
FIG. 6A is a cross section of the device of FIG. 1.
Figure 6B:
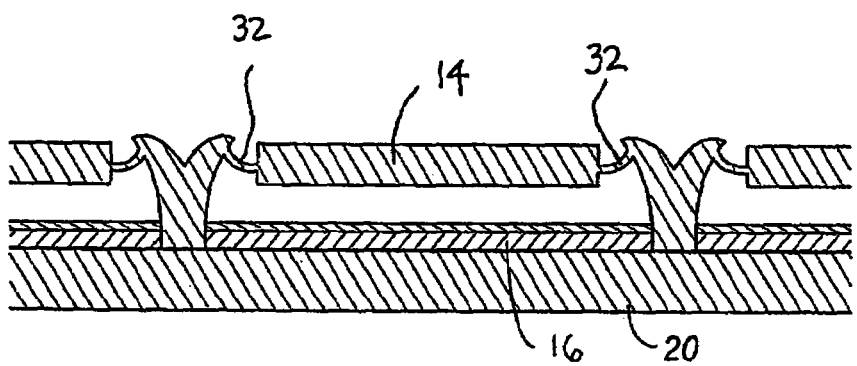
FIG. 6B is a cross section of an alternative embodiment of an interferometric modulator.
Figure 6C:
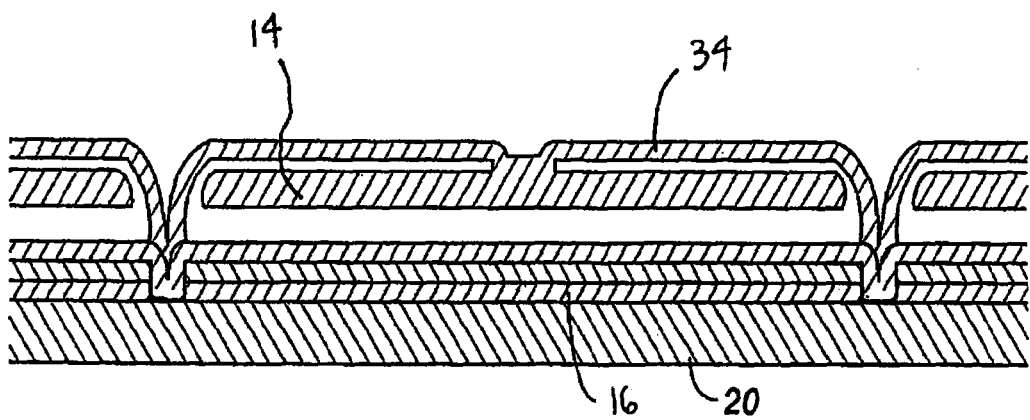
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

In certain embodiments, these interferometric elements provide the capability to individually address and switch selected interferometric elements between at least two states with different reflection and transmission properties. Other interferometric elements which are not switchable are also compatible with embodiments described herein.

Figure 7:
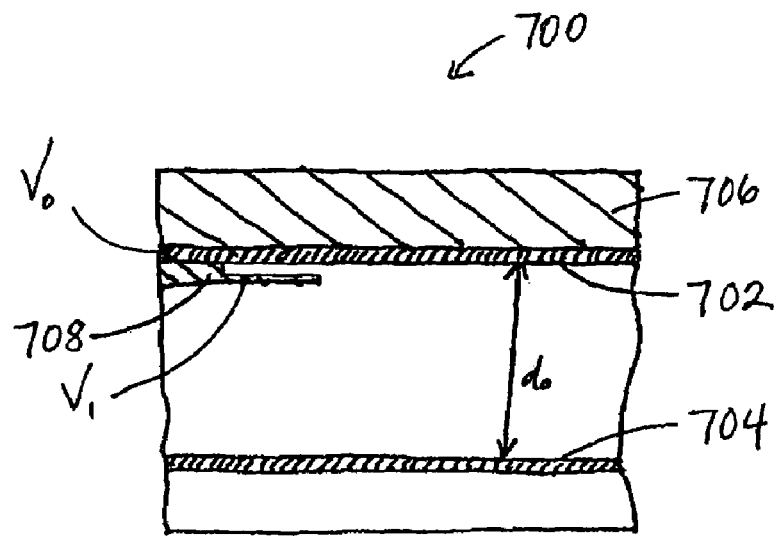
FIG. 7 schematically illustrates an interferometric element compatible with embodiments described herein.

FIG. 7 schematically illustrates an interferometric element 700 having a temperature sensor 708. The illustrated embodiment of the interferometric element 700 is not switchable and thus does not switch between "off" and "on" states as described above. However, the description of the interferometric element 700 applies equally to switchable embodiments including the exemplary switchable embodiments illustrated in FIGS. 6A, 6B, and 6C. For example, the exemplary switchable embodiments illustrated in FIGS. 6A, 6B, and 6C may include the temperature sensor 708. In such embodiments, the interferometric element may switch between "on" and "off" states as well as sense ambient light. Embodiments of the exemplary switchable elements illustrate in FIGS. 6A, 6B, and 6C having a temperature sensor 708 may be advantageous for display electronic devices that incorporate interferometric elements not only for display purposes but also for the ability to sense ambient light. For example, the characteristics sensed by the interferometric element may be utilized to control an optical compensation structure. In certain embodiments, the optical compensation structure is a front light, side light, or back light associated with a display electronic device. The detected intensity or brightness of ambient light can be advantageously used in such embodiments to set the amount of illuminating light for the display electronic device to better make the display device readable in the ambient light.

The interferometric element 700 is configured to sense ambient light. In certain embodiments, the temperature sensor 708 provides one or more characteristics of the sensed ambient light to an electronic device. Characteristics of ambient light include, but are not limited to, wavelength and intensity. Exemplary electronic devices include cameras and fingerprint sensors. In certain embodiments, the interferometric element 700 senses ambient light having at least one wavelength and an intensity associated with the wavelength. In certain embodiments, a camera device receives and stores these characteristics. To form a picture, the camera may receive characteristics from a plurality of adjacent interferometric elements arranged in an array of interferometric elements. In certain embodiments, the received characteristics from the array of interferometric elements are processed and stored as a digital image. Uses of the interferometric element 700 as a camera or other image capture device are described in greater detail in connection with FIG. 8.

In certain embodiments, switchable and non-switchable interferometric elements are both utilized in a display electronic device. On or more of the switchable or non-switchable may include a temperature sensor 708. The switchable or non-switchable interferometric element having the sensor may be located within or outside of the array of switching interferometric elements.

The interferometric element 700 comprises a first surface 702 and a second surface 704 substantially parallel to the first surface 702. The second surface 704 is spaced a gap distance $d_0$ from the first surface 702 in a direction substantially perpendicular to the first surface 702. The first surface 702 is partially transmissive and partially reflective to the at least one wavelength. The second surface 704 is at least partially reflective to light. Exemplary materials for the first surface 702 and the second surface 704 include, but are not limited to, chrome or titanium.

The first surface 702 and the second surface 704 form a resonant cavity (e.g., etalon) in which light interferes with itself as it reflects between the first surface 702 and the second surface 704. The interferometric element 700 absorbs light having at least one wavelength. The at least one wavelength is dependent on the gap distance $d_0$. In the embodiment schematically illustrated by FIG. 7, the interferometric element 700 further comprises a substrate 706 which is substantially transmissive to the at least one wavelength. Light enters the interferometric element 700 through the substrate 706 and reflects between the first surface 702 and the second surface 704. At least a portion of the light incident on the interferometric element 700 having the at least one wavelength is absorbed by the interferometric element 700. The energy associated with this absorbed light in the first surface 702 is dissipated as heat. While the first surface 702 of certain embodiments is on the substrate 706, as schematically illustrated by FIG. 7, in other embodiments, there are one or more intervening layers (e.g., dielectric layers) between the substrate 706 and the first surface 702. In still other embodiments, the interferometric element 700 comprises one or more layers (e.g., dielectric layers) that are on the first surface 702 such that the first surface 702 is between these layers and the substrate 706.

The interferometric element 700 further comprises a temperature sensor 708. The temperature sensor 708 is responsive to changes of temperature of at least a portion of the interferometric element 700 from absorption of light by the interferometric element 700. In the embodiment schematically illustrated by FIG. 7, the temperature sensor 708 is on the first surface 702 and is between the first surface 702 and the second surface 704. Other positions of the temperature sensor 708 are compatible with embodiments described herein. In certain embodiments, the temperature sensor 708 is located adjacent to or spaced from the first surface 702. In such embodiments, the temperature sensor 708 may sense a change in temperature of the portion of the first surface 702 via radiation, convection, conduction, or a combination of one or more physical processes for transferring heat energy. In the exemplary embodiments illustrated in FIGS. 6A, 6B, and 6C, the temperature sensor 708 may be located near or adjacent to an optical stack. In certain embodiments, the optical stack includes the fixed layers 16a, 16b and layers adjacent to the fixed layers. These adjacent layers may include layers of dielectric, chromium, indium-tin-oxide, and the transparent substrate 20.

In certain embodiments, the absorption and the corresponding heat are functions of wavelength. For example, the interferometric element 700 can have different absorption coefficients for red light, green light, and blue light, thereby yielding different amounts of heat for these various wavelengths of incident light. In certain embodiments, the materials of the interferometric element 700 are selected to provide sensitivity to selected ranges of wavelengths. Ranges of wavelengths which can be detected by interferometric elements 700 compatible with embodiments described herein include, but are not limited to, visible wavelengths, infra-red and ultra-violet wavelengths, radio-frequency (RF) wavelengths, and x-rays.

In certain embodiments, the temperature sensor 708 comprises a binary device (e.g., a switch) which is in a first state when the temperature is below a predetermined level and is in a second state when the temperature is above a predetermined level. Certain such switches are formed using micro-electro-mechanical system (MEMS) fabrication techniques. In certain other embodiments, the temperature sensor 708 comprises an analog device.

For example, the temperature sensor 708 may be a contact or non-contact sensor. Exemplary contact temperature sensors that may be used with the embodiments described herein include thermocouples, thermistors, resistance temperature detectors (RTDs), filled system thermometers, bi-metallic thermometers, and semiconductor temperature sensors. For example, a bimetallic thermocouple can be used to generate a voltage difference as a function of the temperature. Exemplary non-contact temperature sensors that may be used with the embodiments described herein include radiation thermometers (for example, pyrometers), thermal imagers, ratio thermometers, optical pyrometers, and fiber optic temperature sensors. Other temperature sensors 708 are compatible with embodiments described herein.

In certain embodiments, more or less surface area of the temperature sensor 708 contacts the first surface 702. Increasing the contact surface area between the temperature sensor 708 and the first surface 702 may advantageously increase the sensitivity of the characteristics measured by the temperature sensor 708.

By absorbing light having the at least one wavelength, the temperature of the interferometric element 700 increases, and the temperature sensor 708 responds to the temperature increase. In certain embodiments, the response of the temperature sensor 708 is determined by measuring a change in voltage of the temperature sensor 708. In the illustrated embodiment, the temperature sensor 708 measures a voltage $(V_0-V_1)$. A change in voltage between $V_0$ and $V_1$ corresponds to a change in the temperature of the portion of the first surface 702. In certain other embodiments, the temperature sensor 708 measures, for example, current, resistance, and/or deflection depending on the selected type of temperature sensor 708.

In certain embodiments, the increase of temperature is dependent on the intensity of the light at the at least one wavelength absorbed by the interferometric element 700. The interferometric element 700 thus serves as a light sensor which is sensitive to the at least one wavelength.

The size of the interferometric elements 700 is a function of the micro-fabrication design rules. In a semiconductor fab, certain embodiments with interferometric elements 700 having areas less than or equal to approximately one square micron are possible. Other certain embodiments provide interferometric elements 700 having areas less than or equal to approximately one-half square micron. Other sizes of interferometric elements 700 are also compatible with embodiments described herein.

Figure 8:
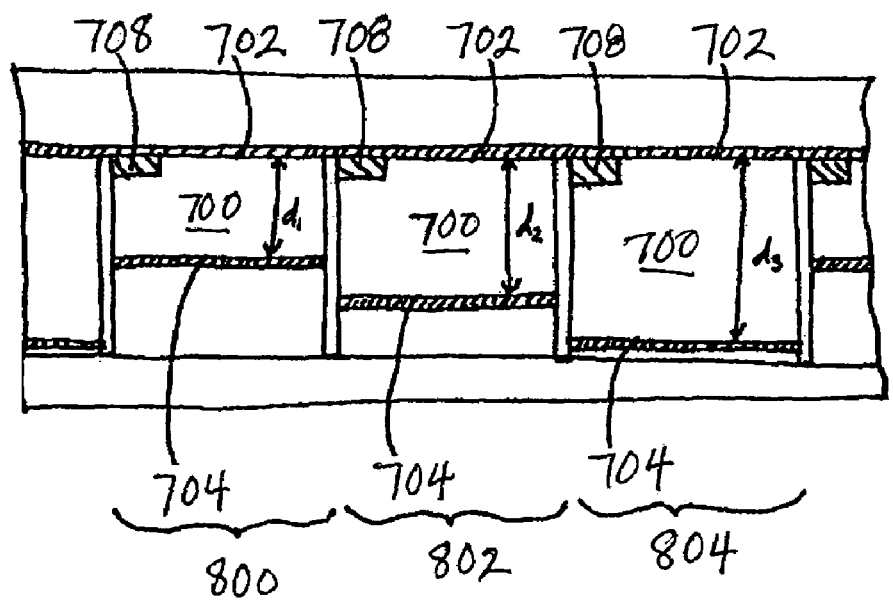
FIG. 8 schematically illustrates a plurality of interferometric elements, each element having a different gap distance.

FIG. 8 schematically illustrates a plurality of interferometric elements 700 comprising three sets of interferometric elements 700. A first set 800 of interferometric elements 700 has a gap distance $d_1$ which corresponds to being substantially reflective to a first range of wavelengths and at least partially absorptive to other wavelengths. A second set 802 of interferometric elements 700 has a second gap distance $d_2$ which corresponds to being substantially reflective to a second range of wavelengths and at least partially absorptive to other wavelengths. A third set 804 of interferometric elements 700 has a third gap distance $d_3$ which corresponds to being substantially reflective to a third range of wavelengths and at least partially absorptive to other wavelengths. The temperature sensor 708 could be made of different materials and/or have a different architecture (MEMS/bi-metallic, etc.) for the three different gaps to optimize their sensitivity.

In certain embodiments, each range of wavelengths comprises a range of colors. In certain embodiments, each range of wavelengths comprises two or more colors. In certain embodiments, the first, second, and third ranges of wavelengths correspond to red, green, and blue, while in other embodiments, the first, second, and third colors correspond to cyan, magenta, and yellow. Certain such embodiments advantageously provide measurements of the intensity of each spectral component. Other ranges of wavelengths are compatible with embodiments described herein.

By using interferometric elements 700 which are absorptive to different ranges of wavelengths, certain embodiments provide a light sensor which can distinguish between wavelengths. For example, by having the interferometric element 700 in FIG. 8 absorptive to red, blue and green, a light imaging sensor can be built. Each pixel of the light imaging sensor consists of the interferometric element 700 that measures the intensity of light for red, green and blue by the respective temperature changes. Much like a CCD, the color is detected by different temperature increase for the three primaries, red, blue and green. Certain such embodiments can be used for image capture, while certain other embodiments can be used for monitoring the brightness of ambient light. The detected brightness of ambient light can be advantageously used in certain embodiments to set the amount of front light or back light illuminating a display device to better make the display device readable in the ambient light.

In certain embodiments, a CCD camera uses an array of interferometric elements 700 having a temperature sensor 708 instead of a piece of silicon to receive incoming light. Each of the interferometric elements sense incoming light as described with reference to FIGS. 6-10. Light is allowed to impinge on the interferometric sensor until the light is extinguished. When the source of light is extinguished (e.g., the shutter is closed), simple electronic circuitry and a microprocessor or computer are used to unload the interferometric sensor, measure the voltage change in each sensor, and process the resulting data into an image on a video monitor or other output media.

Figure 9:
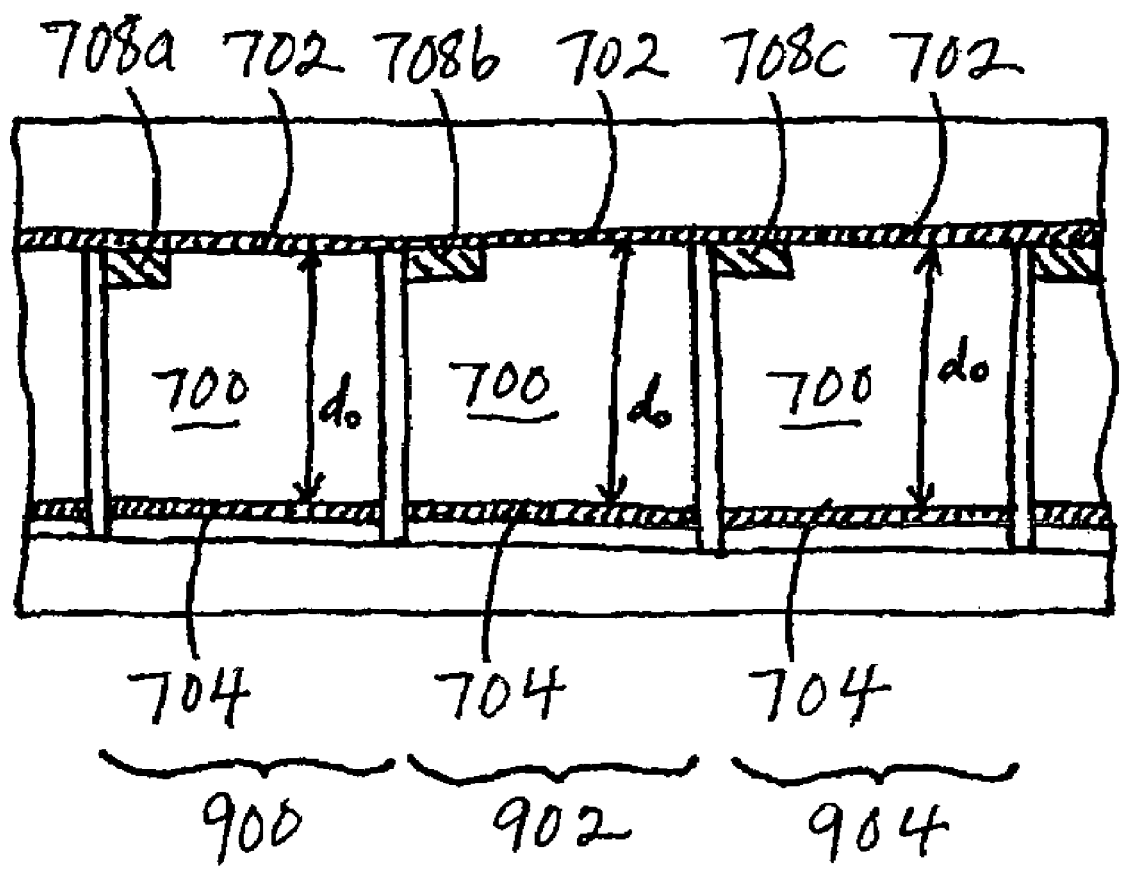
FIG. 9 schematically illustrates a plurality of interferometric elements, each having temperatures sensors responsive to different ranges of temperatures.

FIG. 9 schematically illustrates a plurality of interferometric elements 700 comprising three sets of interferometric elements 700. Each of the interferometric elements 700 has approximately the same gap distance $d_0$, so the interferometric elements 700 are absorptive to the same at least one wavelength. A first set 900 of interferometric elements 700 has a first temperature sensor 708a which is responsive to a first range of temperatures associated with certain ambient or incident light intensity. A second set 902 of interferometric elements 700 has a second temperature sensor 708b which is responsive to a second range of temperatures that is associated with a certain range of ambient or incident light intensity. A third set 904 of interferometric elements 700 has a third temperature sensor 708c which is responsive to a third range of temperatures that is associated with a certain range of ambient or incident light intensity. In certain embodiments, one or more of the first range, second range, and third range of temperatures overlap one another.

By using interferometric elements 700 which are responsive to different ranges of temperatures, certain embodiments advantageously provide a more precise determination of the light intensity in the at least one wavelength absorbed by the interferometric element 700 than is achieved by using temperature sensors 708 responsive to a single range of temperatures. For example, in certain embodiments, the first temperature sensor 708a is a binary device which switches between two states at a first temperature $T_1$, the second temperature sensor 708b is a binary device which switches between two states at a second temperature $T_2$ higher than $T_1$, and the third temperature sensor 708c is a binary device which switches between two states at a third temperature $T_3$ higher than $T_2$. By detecting the states of the three temperature sensors 708a, 20b, 20c, certain embodiments can determine whether the temperature of the interferometric elements 700 is below $T_1$, between $T_1$ and $T_2$, between $T_2$ and $T_3$, or above $T_3$. In certain embodiments, a single interferometric element 700 comprises more than one temperature sensor 708 to provide a similar capability.

Certain embodiments have interferometric elements 700 which provide the capability to individually address and switch selected interferometric elements 700 between at least two states with different reflection and transmission properties. In certain such embodiments, an interferometric element 700 can be switched between two or more states to change the range of wavelengths which the interferometric element 700 absorbs. Thus, certain embodiments advantageously provide the capability to modify the response of the interferometric element 700 at will.

Figure 10A:
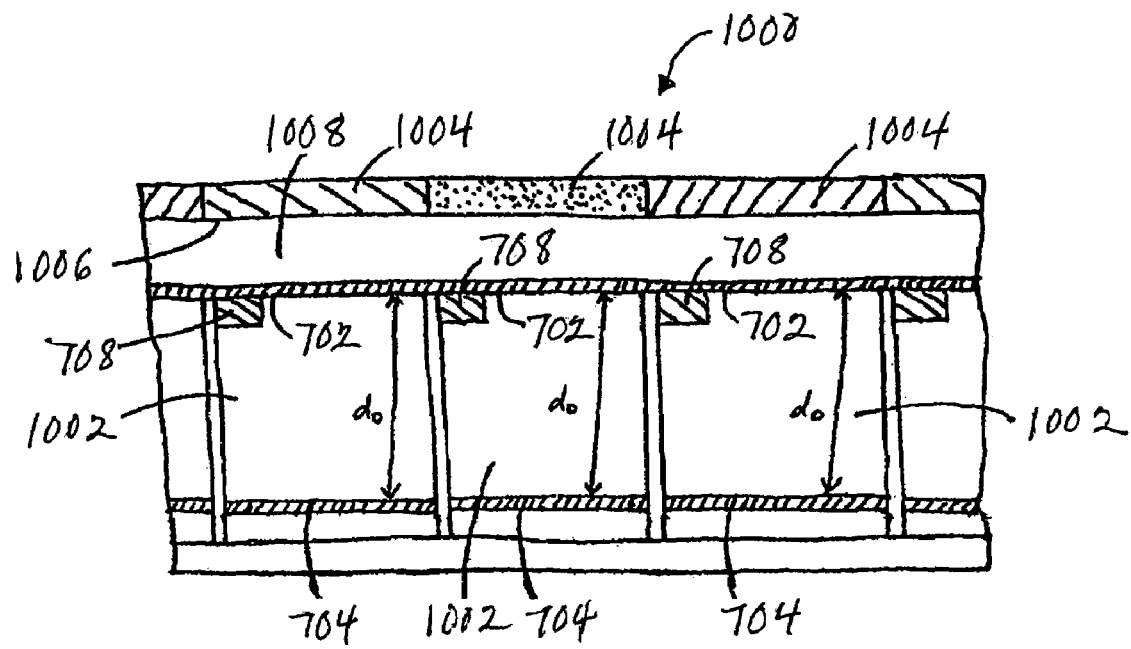
FIGS. 10A and 10B schematically illustrate two embodiments of a light sensor having a plurality of interferometric elements with substantially equal gap distances and a plurality of color filters.
Figure 10B:
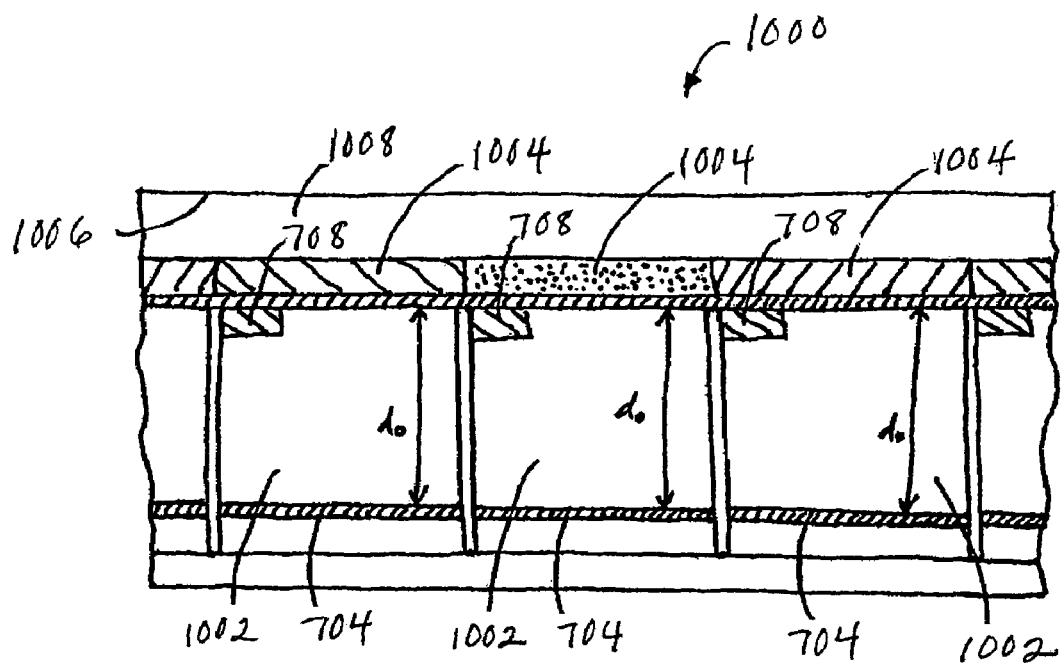

FIGS. 10A and 10B schematically illustrates exemplary embodiments of a light sensor 1000 comprising an array of interferometric elements 1002 and an array of color filters 1004. Each interferometric element 1002 is substantially reflective to at least one wavelength and is at least partially absorptive at other wavelengths. In the embodiment schematically illustrated by FIGS. 10A and 10B, each of the interferometric elements 1002 has the same gap distance $d_0$ such that each interferometric element 1002 absorbs the same at least one wavelength as do the other interferometric elements 1002.

Each color filter 1004 is positioned such that light reflected from a corresponding interferometric element 1002 propagates through the color filter 1004. In the embodiment schematically illustrated by FIG. 10A, the color filters 1004 are positioned outside an outer surface 1006 of a substrate 1008 of the light sensor 1000. In the embodiment schematically illustrated by FIG. 10B, the color filters 1004 are positioned within the outer surface 1006 and are integral with the array of interferometric elements 1002.

Each color filter 1004 has a characteristic transmittance spectrum in which a selected range of wavelengths is substantially transmitted through the color filter 1004 while other wavelengths are substantially not transmitted (e.g., either reflected or absorbed) by the color filter 1004. In certain embodiments, the array of color filters 1004 comprises three subsets of the color filters 1004. Each color filter 1004 of the first subset has a first transmittance spectrum, each color filter 1004 of the second subset has a second transmittance spectrum, and each color filter 1004 of the third subset has a third transmittance spectrum. In certain embodiments, the first, second, and third subsets of the color filters 1004 have transmittance spectra corresponding to substantial transmittance of red, green, and blue light, respectively. In certain other embodiments, the first, second, and third subsets of the color filters 1004 have transmittance spectra corresponding to substantial transmittance of cyan, magenta, and yellow light, respectively. Other color filters 1004 with other transmittance spectra are compatible with embodiments described herein.

Figure 11:
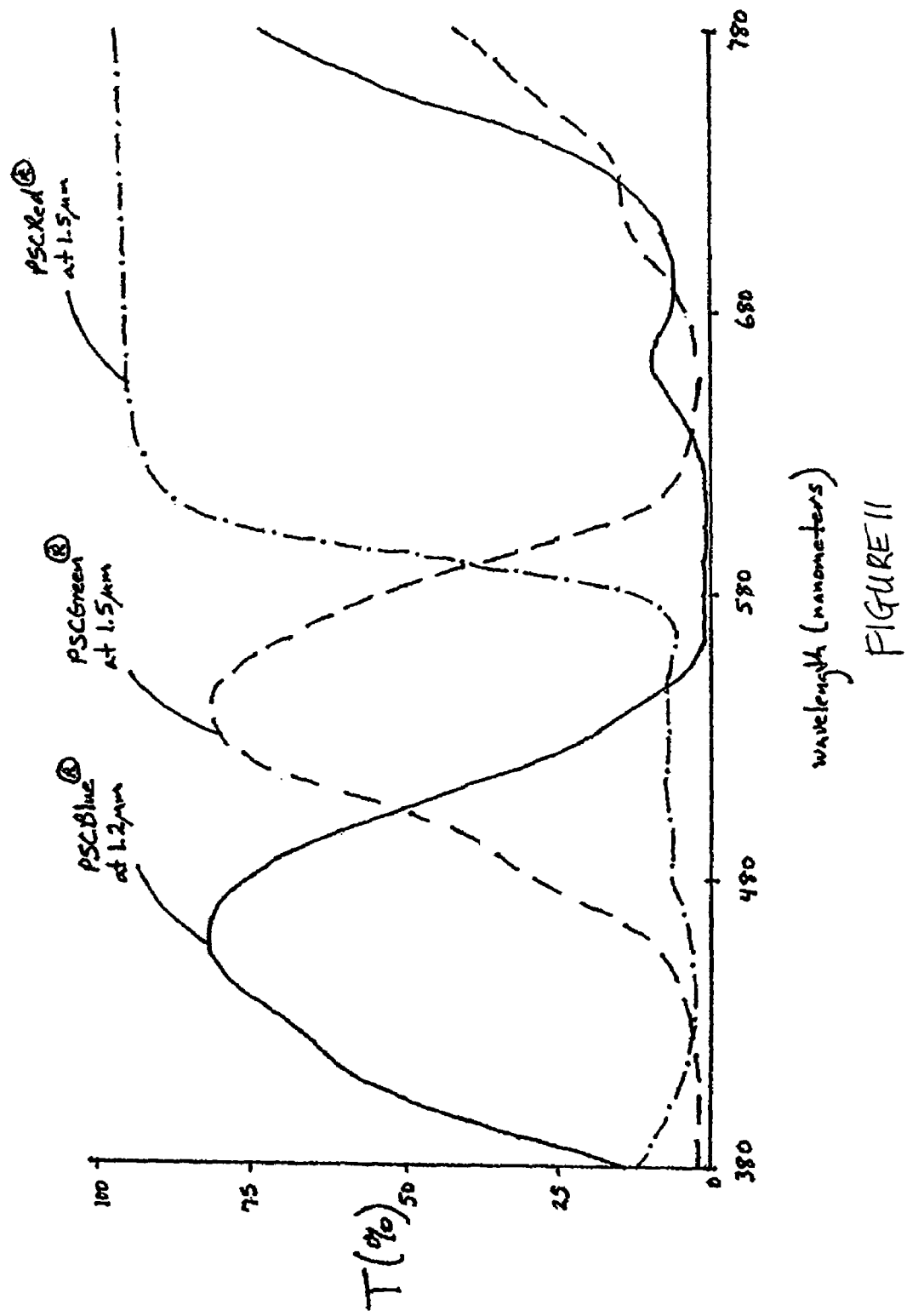
FIG. 11 is a graph of transmittance spectra for a set of three exemplary color filter materials compatible with embodiments described herein.

FIG. 11 is a graph of the transmittance (T) as a function of wavelength (λ) for a set of three exemplary color filter materials compatible with embodiments described herein. The exemplary color filter materials of FIG. 11 are pigmented photosensitive color filter resins available from Brewer Science Specialty Materials of Rolla, Mo. The solid line of FIG. 11 corresponds to the transmission spectrum of a 1.2-micron thick film of PSCBlue®, the dashed line of FIG. 11 corresponds to the transmission spectrum of a 1.5-micron thick film of PSCGreen®, and the dash-dot line of FIG. 11 corresponds to the transmission spectrum of a 1.5-micron thick film of PSCRed®.

Figure 12:
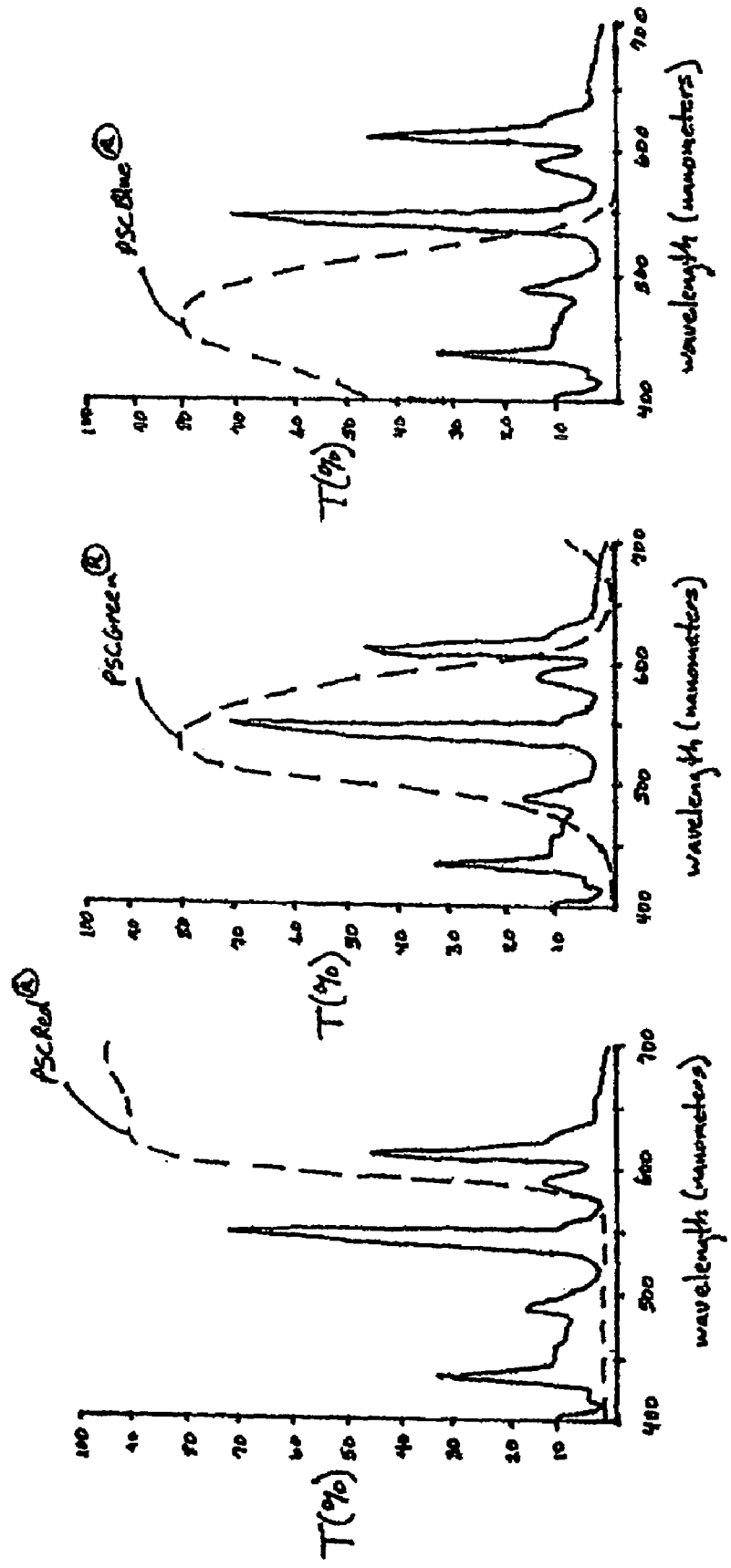
FIGS. 12A, 12B, and 12C are three graphs of the transmittance spectra of the color filter materials of FIG. 11 overlaid with the emission spectrum from a backlight source.

FIGS. 12A-12C are three graphs of the transmittance spectra of the color filter materials of FIG. 11 overlaid with the emission spectrum from a backlight source. The convolution of the transmission spectrum of each color filter material selects a corresponding portion of the emission spectrum of the backlight source. The bandpass character of the transmittance spectrum of each color filter 1004 allows the interferometric elements 1002 to be used as separate color contributions to the pixels of the light sensor 1000.

The thicknesses of the pigment-based color filter materials are selected to provide the desired transmission. Other color filter materials compatible with embodiments described herein include, but are not limited to, interference-based multilayer dielectric structures.

By combining color filters 1004 corresponding to three colors (e.g., red/green/blue or cyan/magenta/yellow) with the interferometric elements 1002 having substantially equal gap distances, certain such embodiments advantageously provide sensitivity to three color lines without patterning the structure of the interferometric elements 1002.

In certain embodiments, color filters 1004 are combined with two or more sets of interferometric elements 1002 having different gap distances. Each set of interferometric elements 1002 absorbs a different range of wavelengths. In certain such embodiments, the color filters 1004 serve to tailor the absorption spectra of the interferometric element/color filter combination (e.g., by narrowing the range of wavelengths which reach the interferometric element 1002).

Figure 13:
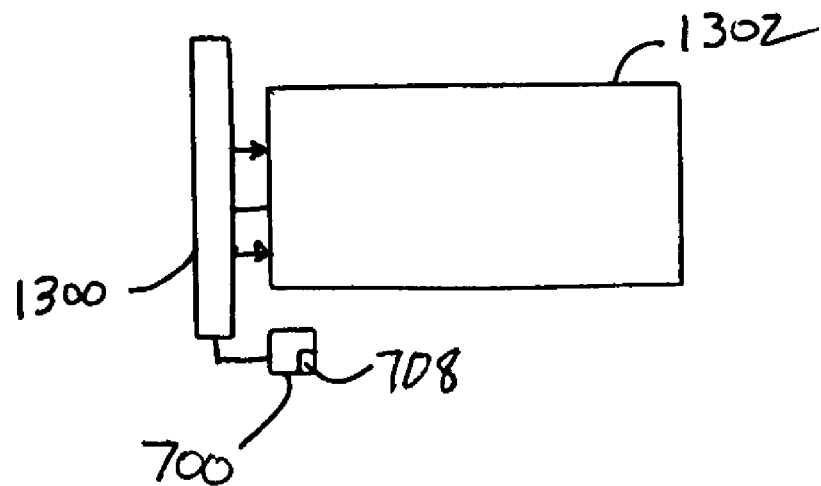
FIG. 13 is a system block diagram illustrating one embodiment of an electronic device incorporating an interferometric element having a temperature sensor for use with a sidelight source.

FIG. 13 is a system block diagram illustrating one embodiment of an electronic device 1302 incorporating an interferometric element 700 having a temperature sensor for use with a sidelight source 1300. The interferometric element 700 may be switchable or non-switchable. The interferometric element 700 absorbs light having at least one wavelength. The at least one wavelength is dependent on the gap distance $d_0$ (see FIG. 7). In the embodiment schematically illustrated by FIG. 13, light enters the interferometric element 700 perpendicular to the plane of the figure and reflects between the first surface 702 and the second surface 704 (see FIG. 7). At least a portion of the light incident on the interferometric element 700 having the at least one wavelength is absorbed by the interferometric element 700. The energy associated with this absorbed light is dissipated as heat. The temperature sensor 708 responds to the change of temperature of at least a portion of the interferometric element 700 from absorption of the light. The temperature sensor 708 may sense a change in temperature of the portion of the interferometric element 700 via radiation, convection, conduction, or a combination of one or more physical processes for transferring heat energy. The sensed change in temperature is received by the sidelight source 1300. The sidelight source 1300 utilizes the sensed characteristic to control an optical compensation structure. In the exemplary embodiment illustrated in FIG. 13, the optical compensation structure is a side light. In certain embodiments, the detected intensity or brightness of ambient light is used to set or adjust the amount of illuminating light for the display electronic device to better make the display device readable in the ambient light.

Figure 14:
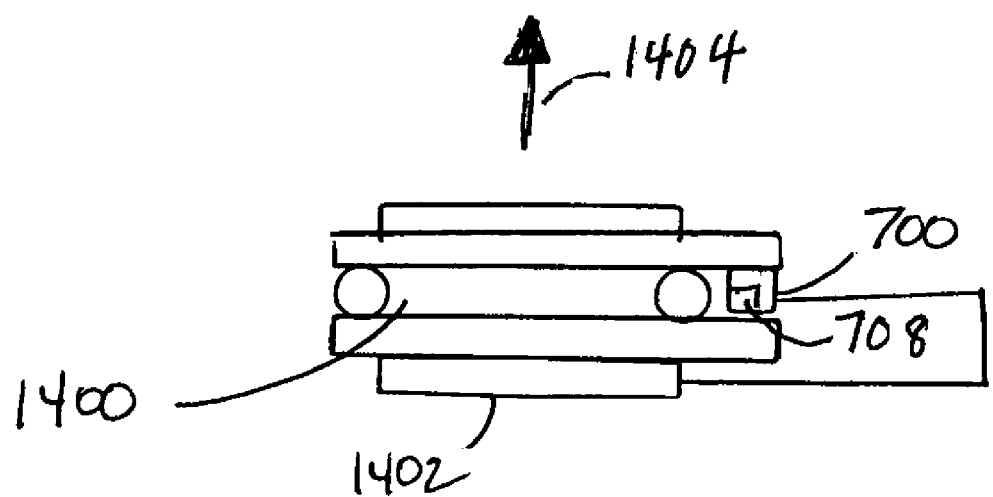
FIG. 14 is a system block diagram illustrating one embodiment of an electronic device incorporating an interferometric element having a temperature sensor for use with a backlight source.

FIG. 14 is a system block diagram illustrating one embodiment of an electronic device 1400 incorporating an interferometric element 700 having a temperature sensor for use with a backlight source 1402. The electronic device 1400 illustrated in FIG. 14 is a liquid crystal display. The interferometric element 700 may be switchable or non-switchable. The interferometric element 700 absorbs light having at least one wavelength. The at least one wavelength is dependent on the gap distance $d_0$ (see FIG. 7). In the embodiment schematically illustrated by FIG. 14, light enters the interferometric element 700 substantially parallel to arrow 1404 and reflects between the first surface 702 and the second surface 704 (see FIG. 7). At least a portion of the light incident on the interferometric element 700 having the at least one wavelength is absorbed by the interferometric element 700. The energy associated with this absorbed light is dissipated as heat. The temperature sensor 708 responds to the change of temperature of at least a portion of the interferometric element 700 from absorption of the light. The temperature sensor 708 may sense a change in temperature of the portion of the interferometric element 700 via radiation, convection, conduction, or a combination of one or more physical processes for transferring heat energy. The sensed change in temperature is received by the backlight source 1402. The backlight source 1402 utilizes the sensed characteristic to control an optical compensation structure. In the exemplary embodiment illustrated in FIG. 14, the optical compensation structure is a backlight. In certain embodiments, the detected intensity or brightness of ambient light is used to set or adjust the amount of illuminating light for the LCD display electronic device to better make the display device readable in the ambient light.

Figure 15:
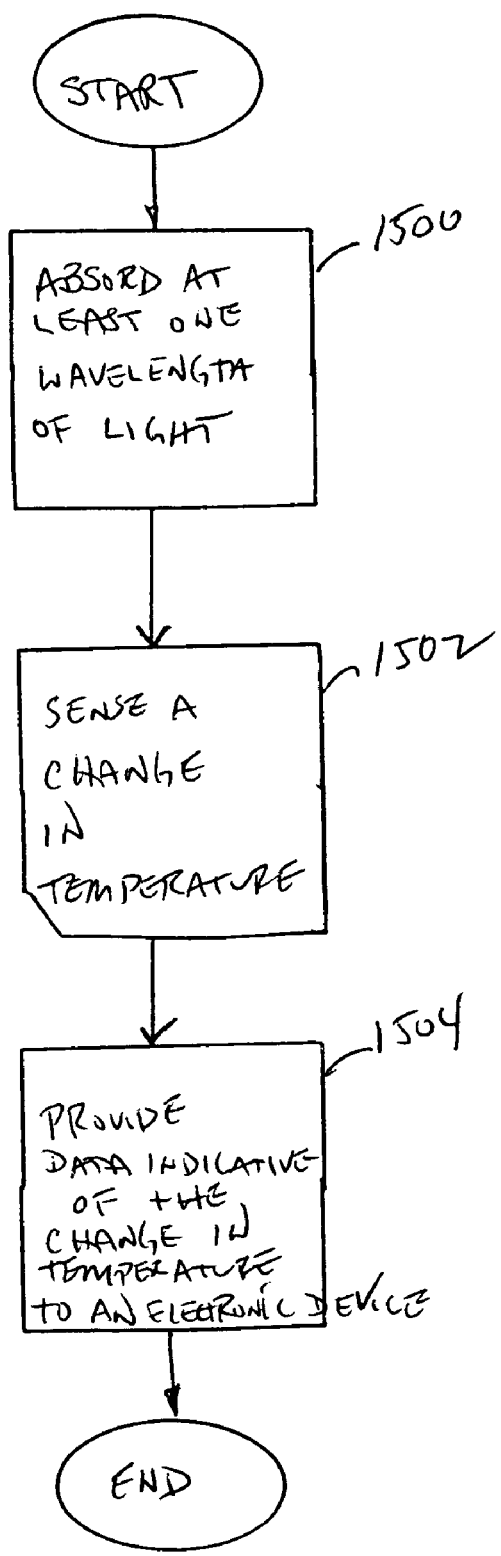
FIG. 15 illustrates a series of exemplary steps for sensing light by an electronic device having an interferometric element and temperature sensor.

FIG. 15 illustrates a series of exemplary steps for sensing light by an electronic device having an embodiment of an interferometric element 700 and temperature sensor 708 as described above. The process begins at a state 1500 where an interferometric element 700 having a temperature sensor 708 absorbs at least one wavelength of light. In certain embodiments, the interferometric element 700 comprises a first surface 702 and a second surface 704 substantially parallel to the first surface 702. The second surface 704 is spaced a gap distance $d_0$ from the first surface 702 in a direction substantially perpendicular to the first surface 702. The first surface 702 is partially transmissive and partially reflective to the at least one wavelength. The second surface 704 is at least partially reflective to light. Exemplary materials for the first surface 702 and the second surface 704 include, but are not limited to, chrome or titanium.

The first surface 702 and the second surface 704 form a resonant cavity (e.g., etalon) in which light interferes with itself as it reflects between the first surface 702 and the second surface 704. The interferometric element 700 absorbs light having at least one wavelength. The energy associated with this absorbed light in the first surface 702 is dissipated as heat. In various embodiments, the first surface 702 is on a substrate 706, as schematically illustrated by FIG. 7. In still other embodiments, the interferometric element 700 comprises one or more layers (e.g., dielectric layers) that are on the first surface 702 such that the first surface 702 is between these layers and the substrate 706.

The size of the interferometric elements 700 is a function of the micro-fabrication design rules. In a semiconductor fab, certain embodiments with interferometric elements 700 having areas less than or equal to approximately one square micron are possible. Other certain embodiments provide interferometric elements 700 having areas less than or equal to approximately one-half square micron. Other sizes of interferometric elements 700 are also compatible with embodiments described herein.

Next, at a state 1502 the temperature sensor 708 senses a change of temperature of at least a portion of the interferometric element 700. The temperature sensor 708 is responsive to changes of temperature of at least a portion of the interferometric element 700 from absorption of light by the interferometric element 700. In the embodiment schematically illustrated by FIG. 7, the temperature sensor 708 is on the first surface 702 and is between the first surface 702 and the second surface 704. Other positions of the temperature sensor 708 are compatible with embodiments described herein. In certain embodiments, the temperature sensor 708 is located adjacent to or spaced from the first surface 702. In such embodiments, the temperature sensor 708 may sense a change in temperature of the portion of the first surface 702 via radiation, convection, conduction, or a combination of one or more physical processes for transferring heat energy. In the exemplary embodiments illustrated in FIGS. 6A, 6B, and 6C, the temperature sensor 708 may be located near or adjacent to an optical stack. In certain embodiments, the optical stack includes the fixed layers 16a, 16b and layers adjacent to the fixed layers. These adjacent layers may include layers of dielectric, chromium, indium-tin-oxide, and the transparent substrate 20.

In certain embodiments, the absorption and the corresponding heat are functions of wavelength. For example, the interferometric element 700 can have different absorption coefficients for red light, green light, and blue light, thereby yielding different amounts of heat for these various wavelengths of incident light. In certain embodiments, the materials of the interferometric element 700 are selected to provide sensitivity to selected ranges of wavelengths. Ranges of wavelengths which can be detected by interferometric elements 700 compatible with embodiments described herein include, but are not limited to, visible wavelengths, infra-red and ultra-violet wavelengths, radio-frequency (RF) wavelengths, and x-rays.

In certain embodiments, the temperature sensor 708 comprises a binary device (e.g., a switch) which is in a first state when the temperature is below a predetermined level and is in a second state when the temperature is above a predetermined level. Certain such switches are formed using micro-electromechanical system (MEMS) fabrication techniques. In certain other embodiments, the temperature sensor 708 comprises an analog device.

For example, the temperature sensor 708 may be a contact or non-contact sensor. Exemplary contact temperature sensors that may be used with the embodiments described herein include thermocouples, thermistors, resistance temperature detectors (RTDs), filled system thermometers, bimetallic thermometers, and semiconductor temperature sensors. For example, a bimetallic thermocouple can be used to generate a voltage difference as a function of the temperature. Exemplary non-contact temperature sensors that may be used with the embodiments described herein include radiation thermometers (for example, pyrometers), thermal imagers, ratio thermometers, optical pyrometers, and fiber optic temperature sensors. Other temperature sensors 708 are compatible with embodiments described herein.

By absorbing light having the at least one wavelength, the temperature of the interferometric element 700 increases, and the temperature sensor 708 responds to the temperature increase. In certain embodiments, the response of the temperature sensor 708 is determined by measuring a change in voltage of the temperature sensor 708. For example, a change in voltage between $V_0$ and $V_1$ corresponds to a change in the temperature of the portion of the first surface 702. In certain embodiments, the increase of temperature is dependent on the intensity of the light at the at least one wavelength absorbed by the interferometric element 700.

Moving to a state 704, data indicative of the sensed change in temperature is provided to the electronic device. Embodiments of the electronic device include a camera or fingerprint sensor. In certain embodiments, the temperature change is processed and stored as a digital image. In certain other embodiments, the temperature change is utilized to set the amount of front light or back light illuminating a display device to better make the display device readable in the ambient light.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. Methods for incorporating the features described above with the interferometric modulators will be readily apparent to one having ordinary skill in the art. Further, one or more of these features may be adapted to work with any of the embodiments, as well as other configurations of the interferometric modulators. As will be recognized, the present invention may be embodied within a form that does not provide all of the features and benefits set forth herein, as some features may be used or practiced separately from others.

What is claimed is:

1. A light sensor having at least one interferometric element, the interferometric element comprising:
   a first surface being partially transmissive and partially reflective to at least one wavelength of light;
   a second surface substantially parallel to the first surface and spaced a first distance from the first surface in a direction substantially perpendicular to the first surface for reflecting at least a portion of the at least one wavelength of light; and
   a temperature sensor responsive to changes of temperature of at least a portion of the interferometric element caused at least in part by absorption of the at least one wavelength of light, wherein the temperature sensor is positioned between the first and second surfaces.

2. The light sensor of claim 1, wherein the temperature sensor comprises a binary device.

3. The light sensor of claim 2, wherein the binary device is in a first state when the temperature is below a predetermined level and is in a second state when the temperature is above a predetermined level.

4. The light sensor of claim 1, wherein the temperature sensor comprises an analog device.

5. The light sensor of claim 4, wherein the analog device comprises a bi-metallic thermocouple.

6. The light sensor of claim 4, wherein the analog device generates a voltage difference as a function of the temperature.

7. The light sensor of claim 1, further comprising a second interferometric modulator comprising:
   a third surface being partially transmissive and partially reflective to at least one second wavelength of light;
   a fourth surface substantially parallel to the third surface and spaced a second distance from the third surface in a direction substantially perpendicular to the third surface for reflecting at least a portion of the at least one wavelength of light; and
   a second temperature sensor responsive to changes of temperature of at least a portion of the second interferometric element from absorption of the at least one second wavelength of light.

8. The light sensor of claim 7, wherein the second temperature sensor comprises a second binary device.

9. The light sensor of claim 8, wherein the second binary device is in a first state when the temperature is below a predetermined level and is in a second state when the temperature is above a predetermined level.

10. The light sensor of claim 7, wherein the second temperature sensor comprises a second analog device.

11. The light sensor of claim 10, wherein the second analog device comprises a bi-metallic thermocouple.

12. The light sensor of claim 10, wherein the second analog device generates a voltage difference as a function of the temperature.

13. The light sensor of claim 1, further comprising a second interferometric modulator comprising,
   a third surface being partially transmissive and partially reflective to the at least one wavelength of light;
   a fourth surface substantially parallel to the third surface and spaced a first distance from the third surface in a direction substantially perpendicular to the third surface for reflecting at least a portion of the at least one wavelength of light; and
   a second temperature sensor responsive to changes of temperature of at least a portion of the second interferometric element from absorption of the at least one wavelength of light, wherein an activation temperature of the second temperature sensor is different than an activation temperature of the temperature sensor.

14. The light sensor of claim 1 further comprising a substrate.

15. The sensor of claim 1, wherein the temperature sensor is responsive to changes of temperature of at least a portion of the first surface.

16. The sensor of claim 7, wherein the second temperature sensor is responsive to changes of temperature of at least a portion of the third surface.

17. The sensor of claim 13, wherein the second temperature sensor is responsive to changes of temperature of at least a portion of the third surface.

* * * * *